UNITED STATES PATENT OFFICE.

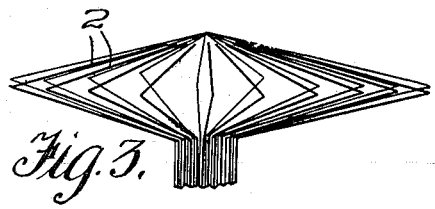
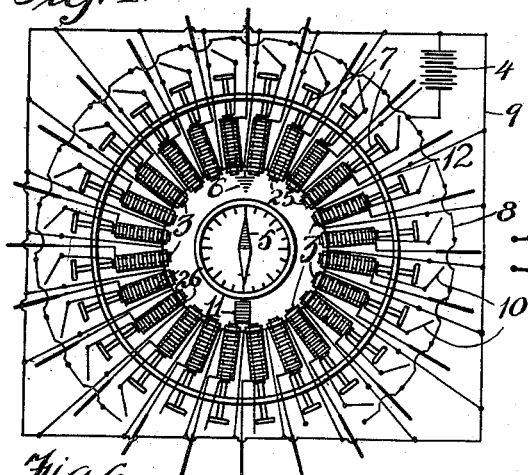
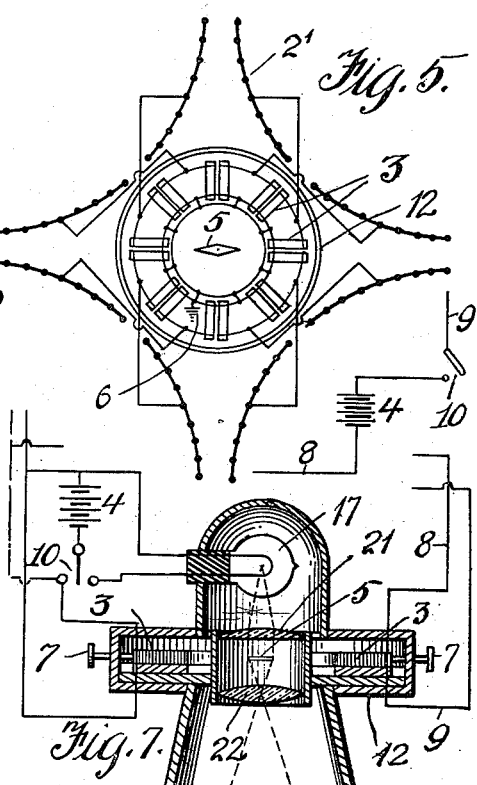
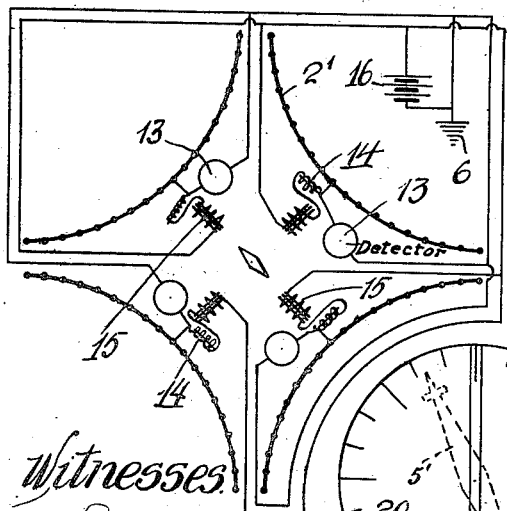
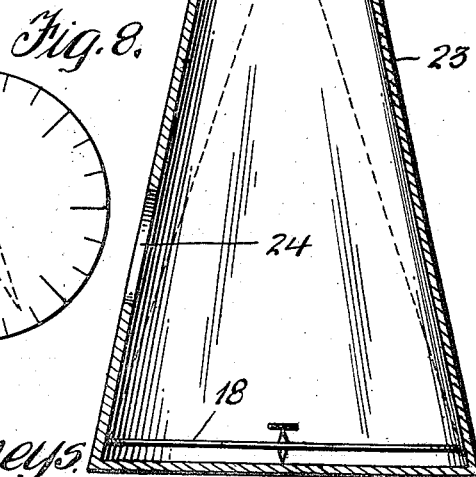

NAOKICHI TANAKA, OF WILKINSBURG, PENNSYLVANIA.

APPARATUS FOR LOCALIZING THE RADIANT POINT OF ELECTROMAGNETIC WAVES.

1,069,355.  Specification of Letters Patent.  Patented Aug. 5, 1913.

Application filed February 3, 1910. Serial No. 541,951.

*To all whom it may concern:*

Be it known that I, NAOKICHI TANAKA, a subject of the Emperor of Japan, residing at Wilkinsburg, in the county of Allegheny and State of Pennsylvania, have invented certain new and useful Improvements in Apparatus for Localizing the Radiant Point of Electromagnetic Waves, of which the following is a specification, reference being had therein to the accompanying drawing.

This invention relates to certain new and useful improvements in apparatus for localizing the radiant point of electro-magnetic waves.

The invention has reference to a means for finding the direction of the source of incident electro-magnetic waves, and has for its chief objects the provision of means for the safe-guarding of ships in fog and for determining the position of the transmitting station in the wireless communication, and also for measuring the distance to a given point especially when unattainable by ordinary means. For better results, the coöperation of wireless telegraph equipment is desirable.

The invention will be hereinafter more particularly described, and in such description reference will be had to the accompanying drawings illustrating a form of apparatus by means of which the objects of the invention may be accomplished, and in which drawings:—

Figures 1 and 2 represent diagrammatically, two forms of elementary antenna wires. Fig. 3 is a view in elevation of an assembled group of antenna wires, the remaining parts of the apparatus being omitted for the sake of clearness. Fig. 4 is a plan view of a direction finder. Fig. 5 is a diagrammatical view of a modification, showing a vertical grid antenna and a direction finder in connection therewith. Fig. 6 is a similar view of a modification showing a form of grid antenna, and showing diagrammatically the relation of antenna wave detectors and direction finder where wave detectors known in wireless telegraphy are to be employed. Fig. 7 is a vertical sectional view of an apparatus for determining the direction of electro-magnetic waves with respect to a given geographical direction, and Fig. 8 is a plan view of the rotatable disk carrying the magnet, and the annular scale, that corresponds to the disk, shown in Fig. 7.

The antenna wires 2 may be of the form shown in Figs. 2 and 3, or of the form shown in Fig. 1 and these wires are firmly held by a suitable frame which is omitted in Fig. 2 for the purpose of clearness, the ends of the wires pointing inward or toward the axis of the frame. Each wire is insulated from the other wires and is connected, in a circular order to each coil of corresponding bobbins 3, (see Fig. 4). A number of these bobbins 3 are radially or circularly-arranged around a sensitive magnetic needle 5, delicately mounted at the center, and adapted to rotate on an annular scale. These bobbins may be provided with adjusting screws 7. In construction, the bobbin comprises a bundle of fine steel wires, or iron wires, or wires of iron alloys, wound around with two helices 25 and 26 (Fig. 4), one for magnetizing the core by a current from battery 4, and the other for de-magnetizing it by electric oscillations set up in the antenna wires coupled with it.

The de-magnetizing coils may either be inserted between the antenna wires or antenna wires and the earth as 6. The terminals of the magnetizing coils 25 are to be in connection by the wires 8 and 9 with the battery circuit, having a multiple switch 10, or a commutator, and the magnetizing coils are so wound and connected that all inner ends of the cores have, when magnetized, the same polarity. The switch is adapted to connect and disconnect separately each magnetizing coil with the battery 4 and preferably to short circuit each coil when the current is interrupted.

At one side of the sensitive needle 5 is an extra coil 11 wound over a soft or annealed iron core which is so connected to battery 4 that the acting end of the core is magnetized in either the same or the opposite polarity according to convenience with the inner ends of the bobbin cores, for the purpose of giving the needle a normal position at start. The coil is preferably placed above or under the needle, though it appears on the same plane, so as not to disturb the magnetic field.

The bobbins and the needle are preferably inclosed in an iron casing 12 to eliminate as far as possible the effect of annoying external magnetic influence.

In Fig. 5, the curved chains 2' represent an antenna or the ends of wire grids or metal plates in cylindrical forms and are preferably grouped as shown. These are separately coupled or connected to corresponding de-magnetizing coils 26 of bobbins 3 of a direction finder which is similarly constructed to that shown in Fig. 4, differing only in the bobbin arrangement and wire connection. The antennæ and the coils of the bobbins 3 are so connected that when any particular part of antennæ receives more energy from one direction it affects the demagnetization of the coils on the corresponding side.

In Fig. 6 the antenna consists of four grids or vertical wires, each having a wave detector 13 in its circuit and each detector closes another circuit which includes a choking coil 14, a direction finder coil 15, having an iron core, and if necessary a battery 16. The direction finder coils 15 are each wound in a single helix of one or more layers and are arranged in radial manner around the sensitive needle 5.

In Figs. 7 and 8 there is illustrated in detail the mechanism adapted to indicate the angle of a direction with respect to a given direction. A small electric lamp 17 is provided at the upper end of the apparatus for projecting a magnified shadow 5' (see Fig. 8) of the sensitive needle 5 on to a scaled rotatable disk 18 carrying with it a rigidly held magnet 19 and having the annular scale 20. The rotatable disk is for use on board ship where the apparatus is constantly changing its position. The lamp 17 may be lighted by the current from battery 4 through switch 10 in such a manner that after each magnetization of the bobbin cores, the circuit can be closed by turning the switch from left to right. The switch however, if it is desired to examine the direction of incident waves from time to time, may be substituted by a slowly acting rotatory commutator. Under the lamp is a direction finder, the construction of which has already been given. Convex lenses 21 and 22 are placed on both sides of the sensitive needle 5 to serve to magnify the shadow of the needle if such shadow be too small for convenient reading. The entire apparatus is firmly set in a casing 23, having an opening 24 in one side thereof for observation of the disk 18. It will of course be understood that the casing 23 must be non-magnetic in the part adjacent to the magnetic disk 18.

The arrangement of the parts may be conveniently modified to constitute them for observation according to the circumstances, for instance, it may be inverted, having the opening 24 at the top.

Where a bent horizontal wire antenna is used and when screening the vertical part of the antenna from the electric waves is not convenient, the apparatus may be in an elongated casing having the needle on the top and the annular scale at the bottom.

In operation, having reference particularly to Figs. 4 and 5, the magnetizing coil circuits including 8, 4, 10, 9 and coil 11 are first closed by means of the switch 10 (or a commutator in event the latter is used) in order to magnetize the bobbin cores 3 and the core of extra coil 11. Then it will be found that the sensitive needle 5 points a certain direction with regard to the magnetism of the core of coil 11, providing the magnetic field due to the magnetism of the bobbin cores is symmetrical with respect to the center, thereby giving the needle a normal position at start. On board ships, the extra coil 11 is preferably placed so as to have the needle point astern the ship when the antenna is placed on the forward deck. Turning the switch from left to right, or by rotation of a commutator which may be used in lieu of the switch, the coil circuits are opened and the switch may be utilized to close the lamp circuit at this time. The apparatus is now ready to respond to electric waves incident on the antenna. Upon the incidence of electro-magnetic waves on the antenna, the sensitive needle 5 deflects to point the bobbin or bobbins which are in connection with the antenna wires most vigorously impinged by the waves, or toward the source of the waves if set accordingly, the core of coil 11 having lost its magnetism owing to its very small magnetic retentivity, after the cut-off of the current from battery 4. It will be understood that if a commutator be employed in place of the switch 10, the swinging of the needle will be observed as long as the waves are received.

The operation of the apparatus using wave detectors other than magnetic ones is similar to that heretofore explained with the exception that these detectors affect the needle by changing their resistance.

The deflections of the sensitive needle 5 can be observed by its shadow on the disk 18 which may be made as shown in Fig. 8 to have a fixed position in virtue of the terrestial magnetism.

It has been demonstrated that the peculiar action of bent wire antennæ depends upon the fact that a bent wire antenna such as shown in Figs. 1 and 2, receives the maximum electro-magnetic waves when the bent side faces toward the radiant point of the waves, just as it has the maximum radiating power on the same side. Hence in a bent wire antenna as shown in Fig. 3, the wires on the side facing the radiant point would have set up in them stronger oscillations than the remainder of the wires, and thereby act most vigorously on the corresponding wave detectors.

The magnetic detectors or the bobbins in Figs. 4 and 5 depend in their action upon the fact that electric oscillations when sent through a coil surrounding a small core, which has been magnetized to saturation, more or less demagnetize it. Consequently, if the bobbin cores on one side of a direction finder be de-magnetized by electric oscillations set up in the antenna, the magnetic field around the sensitive needle will be altered, causing a deflection of the needle toward the bobbin or bobbins corresponding to the antenna wires which have been most vigorously impinged by the waves, since the highest or lowest magnetic potential would occur at that point. For instance, assume that the inner ends of the bobbin cores have north seeking polarity, then the end of the needle with the same polarity would point toward the bobbin or bobbins corresponding to the antenna wires most vigorously affected.

The action of vertical wire grid antenna as seen in Figs. 5 and 6 will be understood when it is considered that a wire grid having its broad side faces toward the incoming waves receives more energy than at any other position, and that such wire grid can screen electro-magnetic waves whose electric force is parallel to the wires. Hence, viewing Figs. 5 and 6, the grids facing the waves are more or less affected by the waves according to their position with respect to the wave direction, thereby affecting corresponding cores with corresponding magnitude either directly as in Fig. 5 or through detectors 13 as in Fig. 6, in which latter construction the change of resistance causes the modification of the magnetization of the cores resulting in the corresponding deflection of the needle.

To obtain a good result, the core wires of the bobbins should be very fine and short and thoroughly covered with suitable films, such as shellac varnish, and the bobbins themselves should be uniform and closely arranged in several layers.

For the form of direction finder I have shown a magnetic detector method because of its simplicity, particularly where a large number of independent wires are to be employed and also of its regularity, suitability, easy adjustment and control for syntonic system, but if other wave detectors are found to be more suitable for certain purposes, they may be substituted in place of the magnetic ones as illustrated in Fig. 6. Some electrolytic and thermal detectors are best known to me to be suitable in lieu of magnetic ones for the present purpose. The connection of antenna to the coils of the direction finder may be made either conductively or inductively, as desired.

What I claim is:

1. An apparatus for localizing the radiant point of electro-magnetic waves comprising a group of antennæ, a magnetic body, cores surrounding said body, a coil wound over each of the cores and connected with said antennæ, and means for magnetizing said cores.

2. An apparatus for the purpose set forth comprising a movable magnetic body, cores surrounding said body, wave detectors, antennæ, and a coil wound over each of said cores and coupled with said antennæ and capable of responding to electro-magnetic waves over said detectors by modifying the magnetization of the cores of said coils in virtue of electric oscillation set up in the antennæ, and means for magnetizing said cores.

3. In receiving apparatus for wireless telegraphy installations the combination of receiving antennæ, a pivoted needle, a plurality of local circuits, a plurality of electro-magnets arranged in said circuits and adapted when energized to influence said needle, and a plurality of quantitative oscillation detectors and circuit-closing devices conductively connected to the antennæ and to said local circuits, said devices adapted to be operated by the disturbances set up in the antennæ to quantitatively close said local circuits.

In testimony whereof I affix my signature in the presence of two witnesses.

NAOKICHI TANAKA.

Witnesses:
KARL H. BUTLER,
EVA A. MILNE.